United States Patent Office 3,361,345
Patented Jan. 2, 1968

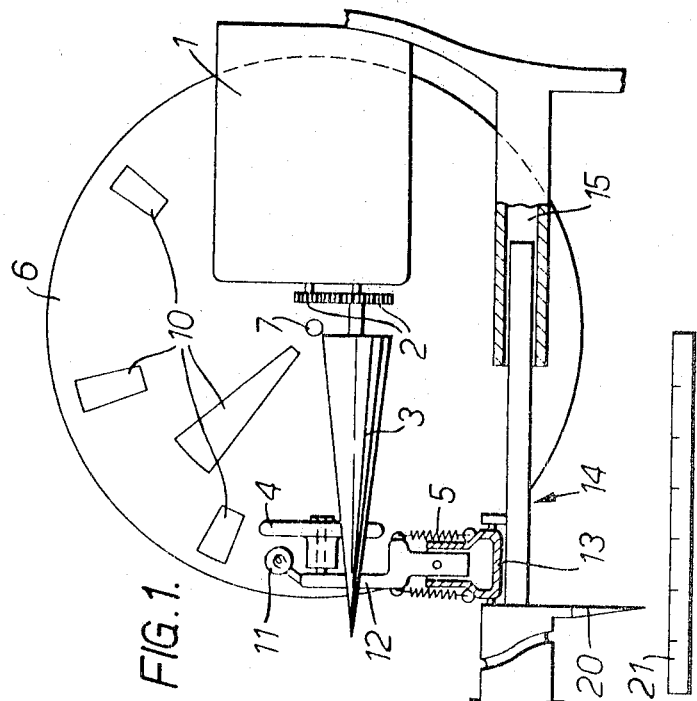
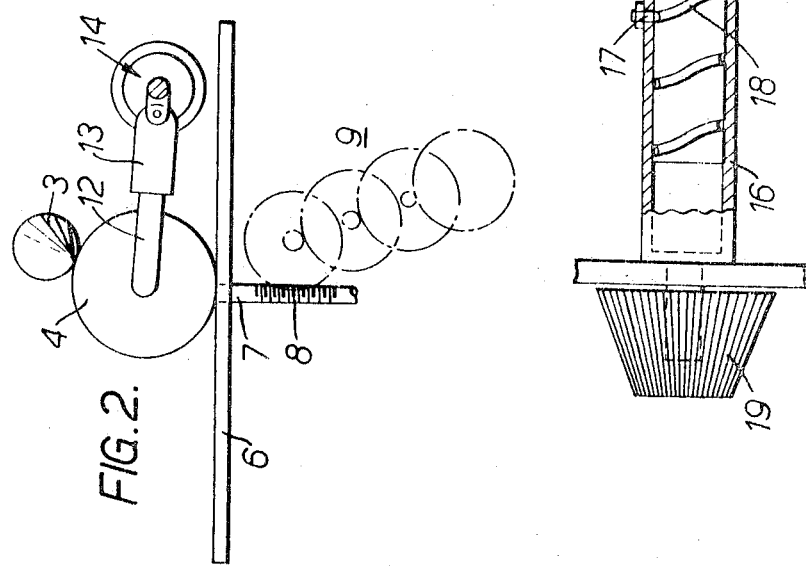

3,361,345
TIME AND RATE METERS FOR VEHICLES
Richard J. Burrough, 44 Bedford Gardens,
London, England
Filed Mar. 17, 1967, Ser. No. 624,092
7 Claims. (Cl. 235—30)

ABSTRACT OF THE DISCLOSURE

The invention concerns a meter for attachment to motor vehicles for operating a pay-as-you-go system of collecting road charges in which a tax is paid in proportion to the time the vehicle is in use. The meter comprises a timing mechanism, a counter operated by the timing mechanism, a selector whereby the number of units recorded by the counter in unit time may be varied, and an indicator for giving a visible signal indicative of the rate at which units are being recorded by the counter.

---

This invention relates to meters intended to be fitted to motor vehicles for operating a pay-as-you-go system of collecting road charges.

An object of the invention is to provide a meter for a motor vehicle whereby the time that vehicle is in use may be recorded for the purpose of levying a tax on that vehicle proportional to its use. A further object of the invention is to provide such a meter in which the recording rate can be readily switched to a different rate depending upon the locality in which the vehicle is being driven, or is parked. A further object of the invention is to provide such a meter having a readily visible sign or signal indicating the recording rate.

In order that the invention may be well understood there will now be described an embodiment thereof, given by way of example only, reference being had to the accompanying drawings, in which:

FIGURE 1 is a diagrammatic side elevation of a preferred embodiment of a meter constructed in accordance with the invention; and FIGURE 2 is a diagrammatic end elevation showing certain details of the same meter.

The meter provided in accordance with this invention comprises a timing mechanism, a counter actuated by the timing mechanism, a selector whereby the number of units recorded by the counter in unit time may be varied, and an indicator for giving a visible signal indicative of the rate at which the units are being recorded by the counter.

The meter provided in accordance with the invention is adapted to be fitted to a motor vehicle, the timing mechanism being driven, for example, by the battery of the vehicle or by a separate clockwork mechanism. Alternatively, the timing mechanism may be driven electrically by a separate battery. The counter may, for example, be a dial or dials with hands moving around the dial or a counter of the type used in a mileometer. While the vehicle is being used, or is parked on the highway, the meter is switched on and records the appropriate number of units corresponding to the length of time in which the vehicle is in use or is so parked. Depending upon the locality where the vehicle is used or parked, the selector is set so that the meter records at one of a multiple number of rates, the more congested the area the higher the rate and vice versa. The selector may be manually operated by the driver of the vehicle who selects the charging rate appropriate to rating the locality or zone in which he is driving or parking and changes over to a higher or lower rate when crossing over into a differently rated locality or zone.

As indicated, the meter includes a visual indicator so that the driver knows the rate at which units are being recorded and preferably the meter is so mounted on the vehicle that this indicator is visible from outside the car so that it can be seen whether a vehicle in a given zone is being metered at the correct rate for that zone.

In one form, the visual indicator comprises a plurality of lights, which may be for instance be of different colours, certain colours or certain combinations being illuminated while the meter is operating to indicate the charging rate.

Meters provided in accordance with the invention may be of the prepayment type in which case they will have to be periodically changed or taken to a charging station, or they may be of a post-payment type in which case the meter will have to be read periodically and a charge levied in accordance with the units recorded. Alternatively, the meters may be coin operated.

In the preferred embodiment of meter, the timing mechanism comprises a governed motor 1 which may be an electric or clockwork motor. This motor drives through gears 2 a conical spindle 3. The spindle could also be cylindrical or stepped. The conical spindle is in friction drive engagement with a jockey pulley 4 which is biased by springs 5 into friction driven engagement with the spindle. In turn, the pulley is in friction driving engagement with a disc 6. The disc is mounted upon a shaft 7 which carries one or more gears 8 which drive the counter 9. Thus, there is provided a drive arrangement from the motor 1 to the counter 9.

The speed of the disc can be varied and hence the number of units recorded by the counter in unit time varied. Such is effected by moving the pulley 4 radially of the disc. As will be realised, the disc will rotate slower the nearer the pulley is to the disc periphery. At the same time, when a conical spindle 3 is adopted, the speed of the pulley itself is varied as the pulley is moved radially of the disc and axially of the spindle, the pulley moving slower the nearer it is to the small diameter end of the spindle. The disc speed is, accordingly, governed by both the radial position of the pulley relative to the disc and the speed of the pulley itself which is slowest at the disc periphery. The spindle is angled so that the line of contact of its periphery with the pulley, and not the axis of the spindle, is parallel to the plane of the disc. There would then be little in and out movement of the pulley and the line of contact of the pulley with the spindle would remain radial to the disc.

The disc forms part of the indicator and has one or more apertures in the form of sectors 10. The disc is opaque apart from these sectors which are transparent and coloured. For example, different radial zones of a sector could be fitted with differently coloured filters. A light signal corresponding with the rate at which units are being recorded by the counter is arranged to be visible through these differently coloured sectors, and is given by a bulb 11 which is movable radially of the disc with the jockey pulley. Thus, the bulb will register with different filters as it is moved across the disc and the resultant light signal emitted through that filter will indicate, by its colour, the disc speed and recording rate of the counter. In addition, since the speed of the disc will vary according to the radial position of the jockey pulley the frequency of light flashes through the disc will also vary and be at a minimum when the bulb is in the vicinity of the periphery of the disc. As a result, the light signals vary both as to colour and frequency according to the recording rate being used. Such light signals would preferably be arranged also to be seen outside the vehicle to give a check on the recording rate at which the meter on that vehicle is set. Light rays from the bulb could be directed through lenses, if necessary, on to the disc.

The recording rate selector controls the position of the jockey pulley and bulb. The jockey pulley is mounted with the bulb on a plunger 12 which is guided in a carrier 13 and is loaded by the springs 5 to maintain the pulley in contact with the conical spindle. The carrier is hinged axially on a rod 14 which can be moved in the plane of the disc to radially move the pulley and light bulb across the disc. The rod bears at its small diameter end in a mounting 15 which prevents the rod from rotating. At its larger diameter end, the rod bears in a sleeve 16 carrying a peg 17 which engages in helical grooves 18 formed in the periphery of the rod. The sleeve can be rotated by means of a knob 19 and is fixed against axial movement, so that rotation of the knob effects, through the peg and helical groove connection, axial movement of the rod and a resultant variation in the recording rate of the counter and light signals obtained from the indicator.

The rod also carries a pointer 20 which can be read off against a scale 21 by the user of the meter to indicate to the user the recording rate to which the meter is set.

Other means could be provided for varying the position of the jockey pulley relative to the disc and could be arranged so as to be controllable by push buttons or levers.

The meters provided in accordance with the invention are of relatively simple construction and a pay-as-you-go system based upon these meters is simple and inexpensive to operate and control. Apart from the meter a minimum of other apparatus is required. This could simply be road signs to indicate the rate for the zone, although the system could be made independent of control by the driver, except when the vehicle is garaged, in which case signal equipment, e.g. a radio transmitter would be required at the boundary of each zone and a receiver on the vehicle to receive the signal from the transmitter and to actuate the selector upon receipt of that signal, thereby to change the recording rate. Further, the charge is levied on the motorist in proportion to the time in which the vehicle is in use and depending upon the area in which the vehicle is used. Also the system permits the rates to be altered at will by traffic wardens or the like depending on the amount of traffic in any one zone at a given time.

I claim:
1. A meter adapted to be mounted on a vehicle for measuring the time that vehicle is in use or parked, said meter comprising:
   (a) a timing mechanism;
   (b) a counter operated by the timing mechanism;
   (c) a selector whereby the number of units recorded by the counter in unit time may be varied; and
   (d) an indicator for giving a visible signal indicative of the rate at which units are being recorded by the counter wherein the indicator comprises a disc of opaque material, a translucent section formed in said disc, and a light source mounted relative to said disc so as to be visible through said translucent section, and wherein said timing mechanism comprises a shaft adapted to rotate said disc at a speed proportional to said recording rate.

2. A meter according to claim 1, wherein said disc has a plurality of transparent sections at different radial distances across the disc and a plurality of differently coloured filters located at said translucent sections, and wherein shift means are provided for moving said light source radially with respect to said disc so as to be visible through said different translucent sections.

3. A meter according to claim 1, wherein said shaft is conical and wherein the selector comprises a drive wheel frictionally engaging between said disc and said shaft and a shift means for moving the drive wheel axially along the conical shaft.

4. A meter according to claim 1, wherein the timing mechanism comprises a constant speed motor and a shaft driven by said motor, said indicator comprises an opaque disc, a translucent section in the disc and a light source mounted relative to said disc so as to shine through said translucent section, said selector comprises a drive wheel and said disc adapted to rotate said disc at a speed proportional to said recording rate, said counter comprises a shaft adapted to be driven by said disc to operate the counter, and said selector comprises a drive wheel in frictional engagement between the first said shaft and said disc and adapted to rotate said disc at a speed proportional to said recording rate and shift means adapted to move said drive wheel radially of the said disc to alter the speed of rotation of the disc.

5. A meter according to claim 4, wherein the first said shaft is conical.

6. A meter according to claim 4, wherein a plurality of translucent sections are provided in said disc at different radial locations and wherein said light source is movable radially of the disc by said shift means so as to be visible through said different translucent sections.

7. A meter according to claim 6, wherein a plurality of differently coloured filters are provided on said disc at said different translucent sections.

References Cited
UNITED STATES PATENTS

| | | | |
|---|---|---|---|
| 1,843,166 | 2/1932 | Kern | 235—30 |
| 2,428,080 | 9/1947 | Horn | 235—30 |
| 2,637,492 | 5/1953 | Winch | 235—30 |
| 2,698,132 | 12/1954 | Pontbriand | 235—30 |
| 3,069,839 | 12/1962 | Johnson et al. | 235—30 |

RICHARD B. WILKINSON, *Primary Examiner.*

STANLEY A. WAL, *Assistant Examiner.*